United States Patent
Holmes et al.

[15] 3,678,810
[45] July 25, 1972

[54] ROTATIONAL COUPLING

[72] Inventors: Lloyd H. Holmes, Arlington; William D. Sundland, Dallas, both of Tex.

[73] Assignee: LTV Electrosystems, Inc., Greenville, Tex.

[22] Filed: June 4, 1970

[21] Appl. No.: 43,433

[52] U.S. Cl. ................................92/119, 92/161, 285/133, 285/135
[51] Int. Cl. ..................F01b 15/04, F16l 47/00, F16l 39/00
[58] Field of Search ..................92/161, 119; 285/133, 138, 285/370, 135, 134

[56] References Cited

UNITED STATES PATENTS

| | | | |
|---|---|---|---|
| 2,705,650 | 4/1955 | McSaum | 285/135 |
| 2,700,558 | 1/1955 | Hieronymus | 285/135 |
| 1,500,921 | 7/1924 | Branson et al. | 92/119 |
| 3,096,077 | 7/1963 | Forsyth | 92/161 |
| 3,202,062 | 8/1965 | Burden | 92/119 |
| 3,152,522 | 10/1964 | Burden et al. | 92/119 |
| 3,153,988 | 10/1964 | Warstler | 92/161 |
| 3,484,853 | 12/1969 | Nishi | 285/134 |
| 2,791,449 | 5/1957 | Monroe | 285/134 |

FOREIGN PATENTS OR APPLICATIONS

| | | | |
|---|---|---|---|
| 1,034,431 | 7/1958 | Germany | 285/135 |

*Primary Examiner*—Martin P. Schwadron
*Assistant Examiner*—A. M. Zupic
*Attorney*—Richards, Harris & Hubbard and James D. Willborn

[57] ABSTRACT

A concentric arrangement of two transfer tubes provides dual fluid flow channels between a supporting housing and a movable actuator. Each of the two transfer tubes is flexibly sealed both in the supporting housing and the movable actuator. The two concentric transfer tubes thus provide a rotational coupling between the fixed support and an actuator having rotational freedom about more than a single axis.

7 Claims, 5 Drawing Figures

INVENTOR
LLOYD H. HOLMES
WILLIAM D. SUNDLAND

Richards, Harris, Hubbard
ATTORNEY

INVENTOR
LLOYD H. HOLMES
WILLIAM D. SUNDLAND

Richards, Harris, Hubbard
ATTORNEY

INVENTOR
LLOYD H. HOLMES
WILLIAM D. SUNDLAND

Richards, Harris & Hubbard
ATTORNEY

ROTATIONAL COUPLING

This invention relates to a rotational coupler, and more particularly to a dual flow concentric rotational coupler.

Heretofore, when coupling fluid between a fixed manifold and a movable actuator, flexible hoses were commonly employed. Although the flexible hose connection provided a satisfactory arrangement for low temperature applications where little movement of the actuator was required, for high temperature applications the flexible hose type connection suffered from an unacceptably high failure rate. For high temperature application, the rubber inner liner of the flexible hose deteriorated until leakage resulted. Where there is considerable flexing of the hose, the failure rate is also unacceptably high. Frequent rotational movement of the actuator produced a continual bending of the flexible hose which resulted in work hardening of the hose with subsequent failure.

Another common technique for interconnecting a manifold to a movable actuator employs a metal tube with a flexure-loop formed therein. The flexure-loop metal-tube interconnection adequately solved the problem of high temperature operation; however, a metal tube interconnection is even more susceptible to work hardening failures than the flexible hose connection.

Accordingly, it is an object of this invention to provide a rotational coupling for high temperature operation. Another object of this invention is to provide a rotational coupling having a high reliability factor. A further object of this invention is to provide a rotational coupling without flexure of the coupler parts. A still further object of this invention is to provide a rotational coupler for dual fluid flow through concentric passages. Yet another object of this invention is to provide a rotational coupler for joining misalligned sections.

In accordance with the present invention, a rotational coupler for dual concentric flow includes a first transfer tube extending from a fluid supply source to a movable member for delivery of fluid between the source and the movable member. This first transfer tube has flexible seals that form fluid-tight couplings at the supply source and the movable member. A second transfer tube, coaxial with the first transfer tube, also extends from the supply source to the movable member for delivery of fluid between the source and the movable member. This second transfer tube also has flexible seals for creating a fluid-tight coupling between the supply source and the movable member.

In accordance with a more specific embodiment of the invention, a rotational coupler includes a first transfer tube extending from a fixed housing to a pivotally-mounted fluid actuator for delivery of fluid between the housing and the actuator. This first transfer tube has flexible seals at each end to form a liquid-tight coupling at the fixed housing and the fluid actuator. A second transfer tube is coaxially mounted with respect to the first transfer tube and also extends from the fixed housing to the fluid actuator for forming a second fluid passage between the housing and the actuator. This second transfer tube also has flexible seals at either end to create a fluid-tight coupling at the fixed housing and the actuator.

A more complete understanding of the invention and its advantages will be apparent from the specification and claims and from the accompanying drawings illustrative of the invention.

Referring to the drawings.

Although the invention will be described with reference to a dual-flow rotational coupler between a mounting manifold and a fluid actuator, other applications of the coupler are possible. For example, the rotational coupler of the present invention may be employed as a dual-flow universal coupling between pipes or tubing. The coupler provides axial, radial and rotary movement between the coupled pipes and enables the coupling of parallel offset or combinations of angular and offset misalignment between coupled pipes. Fluids transferred through the dual passages of the coupler may be either a liquid or a gas.

Figure 1:
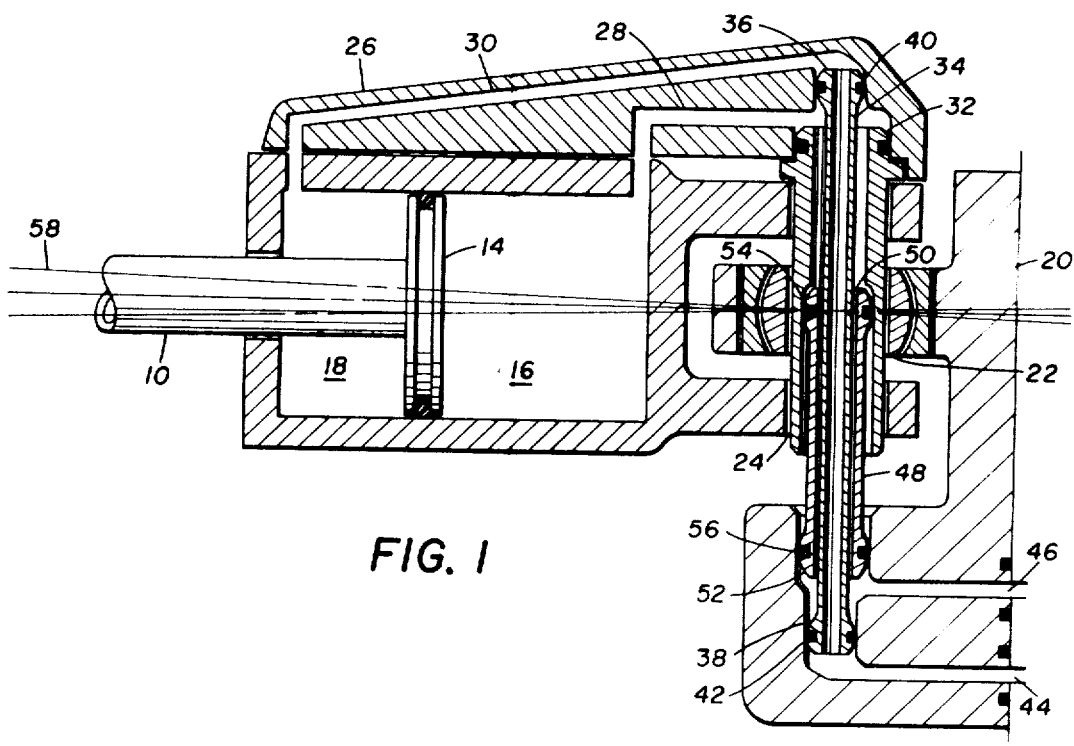
FIG. 1 is a sectional view of a rotational coupler for dual fluid flow between a supporting structure and a rotatable fluid actuator.

Referring to FIG. 1, to produce movement of the piston rod 10 of a fluid actuator 12, fluid is pumped into and out of chambers formed on either side of a piston 14. To extend the piston rod 10, fluid is pumped into the chamber 16 and removed from the chamber 18. In a typical application, the piston rod 10 provides the force for positioning an aircraft control surface, such as a wing spoiler. As the spoiler rotates from its stowed position into the airstream, the actuator 12 rotates with respect to a fixed support fixture 20 by means of a bearing 22. The actuator 12 is supported by the bearing 22 by means of a hollow clevis pin 24.

To deliver fluid into the chamber 16 and remove fluid from the chamber 18 when extending the piston rod 10, a rotational coupler in accordance with the present invention provides concentric fluid passages from a manifold in the support fixture 20 to an actuator manifold 26 containing channels 28 and 30, opening into the chambers 16 and 18, respectively. The manifold 26 mounts to the actuator 12 in a fluid-tight arrangement and includes an opening for receiving one end of the clevis pin 24. An O-ring seal 32 in an annular groove of the clevis pin 24 provides a fluid seal for the passage 28.

The rotational coupler illustrated in FIG. 1 consists of a transfer tube 34 terminating at a bulbous end 36 in the manifold 26 and a bulbous end 38 in a manifold of the support fixture 20. An O-ring seal 40 in an annular groove of the bulbous end 36 provides a seal between the channel 28 and the channel 30. Similarly, an O-ring seal 42 in an annular groove in the bulbous end 38 provides a seal between a channel 44 and a channel 46 that form the manifold of the support fixture 20.

Concentrically mounted with respect to the transfer tube 34 is a transfer tube 48 terminating at a bulbous end 50 in the clevis pin 24 and a bulbous end 52 in the support fixture 20. An O-ring seal 54 in an annular groove of the bulbous end 50 provides a seal between the channel 28 and the atmosphere. Similarly, an O-ring seal 56 in an annular groove of the bulbous end 52 provides a seal between the channel 46 and atmosphere.

With the rotational coupling illustrated and described, fluid is pumped into the transfer tube 34 and through the channel 30 into the chamber 18 to retract the piston rod 10. When retracting the piston rod 10, the piston 14 forces fluid from the chamber 16 through the channel 28 and the transfer tube 48 into a reservoir (not shown) through the channel 46. To extend the piston 10, the reverse fluid flow takes place. Thus, the rotational coupling consisting of the transfer tubes 34 and 48 providing concentric passages for fluid flow into and out of the chambers of the actuator 12.

Figure 2:
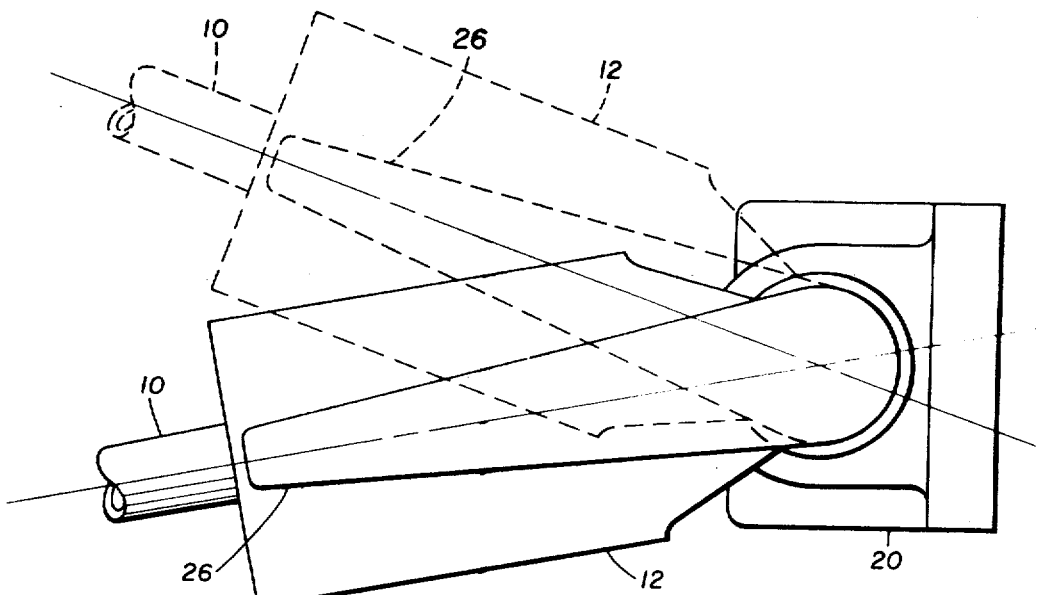
FIG. 2 is a plan view of the arrangement of FIG. 1 for illustrating the rotational movement of the fluid actuator.

As explained previously, as the actuator positions the control surface of an aircraft, it rotates with respect to the support fixture 20. This is shown by the dotted outline of FIG. 2. In addition to providing a rotational coupling about the longitudinal axis of the transfer tubes, as shown in FIG. 2, the coupler of the present invention also allows angular movement about the longitudinal axis of the actuator 12, as illustrated by the center line 58. Further, with the coupler of the present invention, the actuator 12 will be free to rotate about the longitudinal axis thereof. An additional feature of the rotational coupler is that a slight misalignment between the manifold of the support fixture 20 and the clevis pin 24 will not interfere with assembly of the actuator 12 to the support. Also, when assembling the transfer tube coupler, no preloading of the components is required, thus significantly simplifying assembly.

Figure 3:
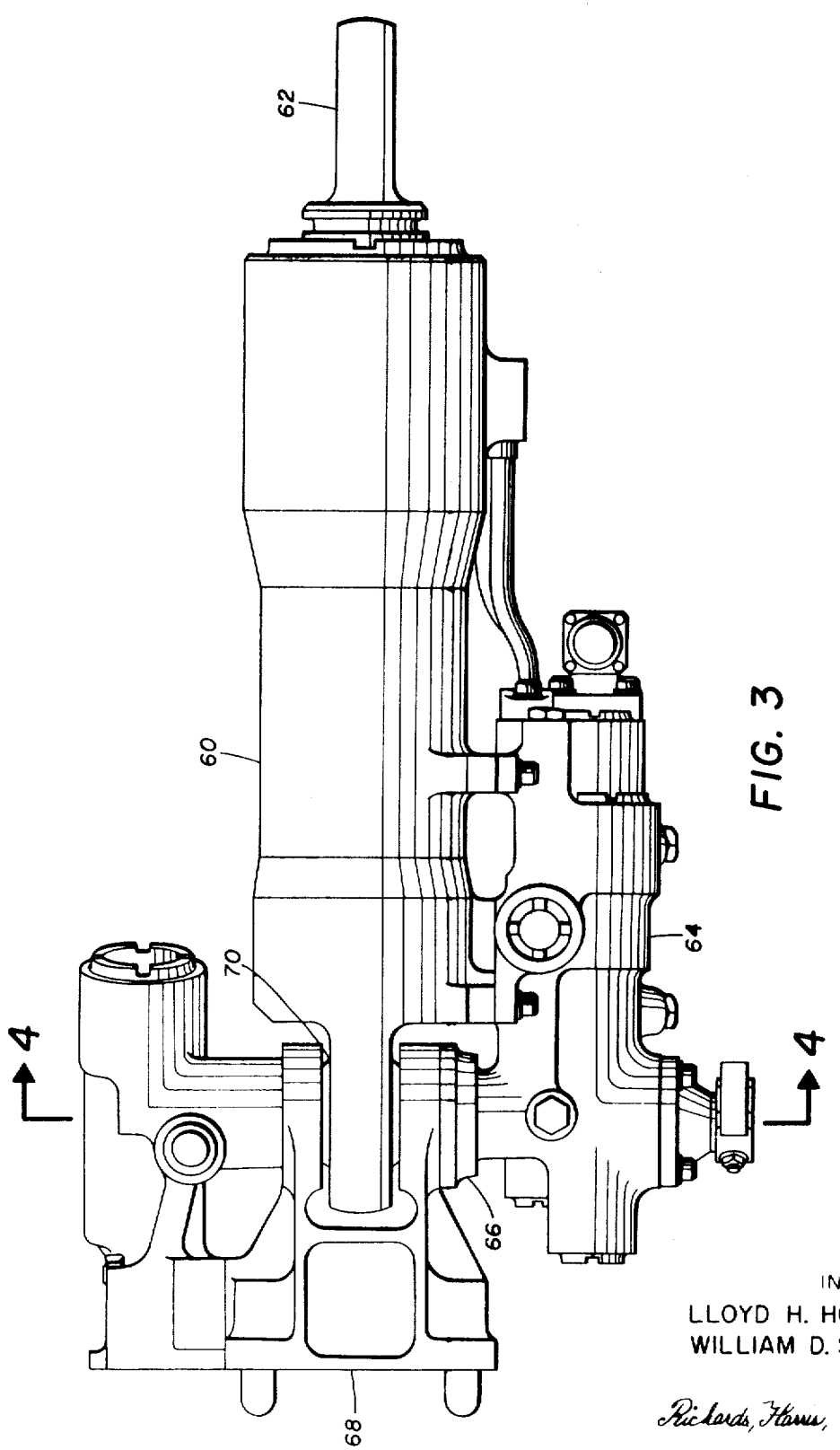
FIG. 3 is a plan view of a model of a fluid actuator coupled to a fluid supply through a rotational coupler in accordance with the present invention.
Figure 4:
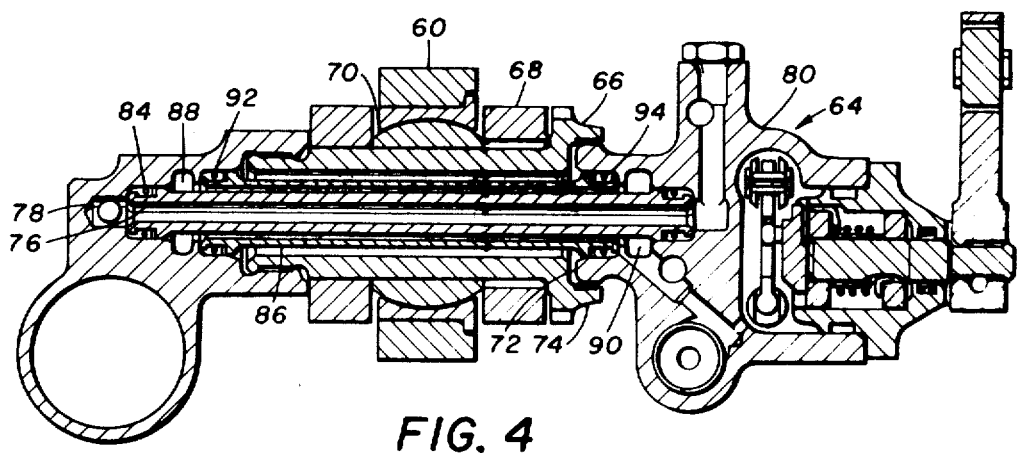
FIG. 4 is a sectional view of FIG. 3 taken along the line 4—4 and illustrating the rotational coupler.

Referring to FIGS. 3 and 4, there is illustrated an embodiment of the present invention for supplying operating fluid to a power actuator for positioning wing spoilers on a supersonic transport aircraft. The advantages of the rotational coupler are dramatically emphasized in such an application. At supersonic speeds, it is estimated that the temperature of the actuator and surrounding wing structure, including the actuator support, will reach temperatures at which a flexible hose coupling will deteriorate rapidly. Further, it is estimated that the wings on some large transports will flap several feet. This flapping motion of the wing will cause the actuator to rotate about the longitudinal axis thereof with respect to the support structure.

A wing spoiler actuator 60 includes a piston rod terminating at a bushing 62 for coupling to linkage (not shown) of a spoiler mechanism. Fluid for operating the actuator 60 is directed into the actuator chambers by means of a servo-valve 64 rigidly secured to the actuator housing to move therewith. The servo-valve 64 mates with an open end of a clevis pin 66 and rotates with the actuator 60 about the clevis pin. Operating fluid is supplied to the servo-valve 64 through a manifold that forms an integral part of a support bracket 68.

As illustrated in FIG. 4, the clevis pin 66 is threaded into the manifold of the support bracket 68. A bearing 70 is fitted on the clevis pin 66 to provide a universal pivoting support for the actuator 60. A collar 72 of the servo-valve 64 loosely fits into an open end of the clevis pin 66 and a felt seal 74, between the collar 72 and the inner surface of the pin 66 provides a dirt seal. This seal, however, allows the servo-valve 64 to be axially displaced with respect to the clevis pin.

To direct fluid from the manifold of the support bracket 68 to the servo-valve 64, a transfer tube 76 extends from the manifold of the support bracket 68 into the housing of the servo-valve 64. At one end, the transfer tube 76 communicates with a channel 78 from a fluid supply (not shown). At the servo-valve end, the transfer tube 76 terminates at a channel 80 leading to the valve mechanism for directing fluid into the chambers of the actuator 60. Ring-type seals 82 and 84 form part of the opposite ends of the transfer tube 76 and provide a fluid seal at the channel 80 and channel 78, respectively.

Concentrically mounted with respect to the transfer tube 76 is a transfer tube 86 communicating with a channel 88 in the manifold of the support bracket 68 and a channel 90 of the servo-valve 64. Again, ring-type seals 92 and 94 provide a fluid seal for the channels 88 and 90, respectively.

Although the actuator 60 operates in a manner substantially as described with respect to the actuator 12 (FIG. 1), a fluid pumped into the chambers of the actuator of FIG. 3 will be supplied unidirectionally through the transfer tube 76 for both extension or retraction of the bushing 62. Similarly, fluid forced from the chambers of the actuator 60 will be discharged unidirectionally through the servo-valve 64 into the transfer tube 86. Thus, by use of the servo-valve 64, the transfer tubes 76 and 86 are the supply and return channels, respectively, for the actuator 60.

Functionally, the rotational coupling of FIG. 4, consisting of the transfer tubes 76 and 86 is similar to the rotational coupling illustrated in FIG. 1. Rotational movement of the actuator 60 along an axis longitudinal of the transfer tubes will be restricted only by structure other than the coupling itself. The ring-type seals at the ends of the transfer tubes 76 and 86 are of a material that has a resiliency to permit angular motion between the transfer tubes and their mating surfaces. With this resiliency, the actuator 60 is also free to rotate about its longitudinal axis without stress on the rotating coupling.

Figure 5:
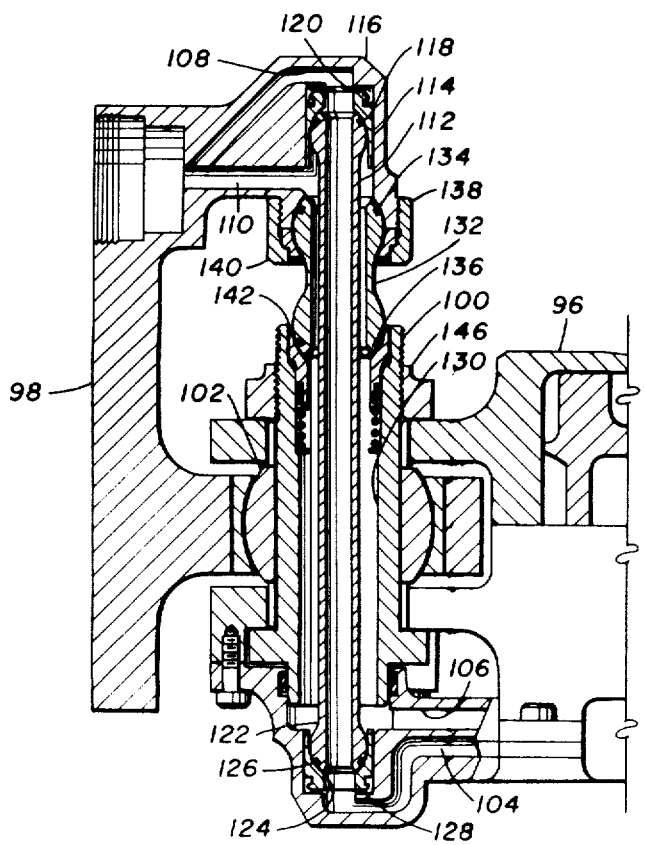
FIG. 5 is a sectional view of another embodiment of a model of a rotational coupler in accordance with the present invention.

With the configuration of FIG. 4, a limited amount of rotation of the actuator 60 about the longitudinal axis thereof is possible. With the construction as illustrated in FIG. 1, the rotational coupling permits a greater amount of rotational freedom of the actuator about its longitudinal axis than with configuration of FIG. 4. Referring to FIG. 5, there is shown an embodiment of a dual-flow rotational coupler for applications where the actuator will have a wide angular rotational motion about its longitudinal axis. In this configuration, an actuator 96 (partially cut away and in section) is mounted to a supporting structure 98 by means of a clevis pin 100 and a bearing 102. Operating fluid is directed into the chambers of the actuator 96 through a channel 104 and from the chambers through a channel 106.

The rotational coupling for directing fluid into the channel 104 from a channel 108 and from the channel 106 into a channel 110 includes transfer tubes 112 and 132. At the channel 108 end of the transfer tube 112, a bulbous end 114 mates with a swivel cap 116. An O-ring seal 118 fitted into an angular groove in the bulbous end 114 provides a fluid seal between the channel 108 and atmosphere. As illustrated, the outer surface of the bulbous end 114 mates with an inner curved surface of the cap 116. This enables rotation of the transfer tube 112 over a greater distance than the embodiment of FIG. 1. To maintain the cap 116 in contact with the bulbous end 114, a spring washer 120 exerts a downward force on the cap against the transfer tube. A similar arrangement is provided at the servo-valve end of the transfer tube 112. A bulbous end 122 mates with the inner surface of a cap 124. An O-ring seal 126 produces a fluid seal between the bulbous end and the cap. A spring washer 128 exerts an upward force against the cap 124 to maintain a fluid-tight connection between the inner surface of the cap and the bulbous end.

The return passage for fluid from the actuator 96 includes a channel 130 in the clevis pin 100 and the transfer tube 132 having bulbous ends 134 and 136. The bulbous end 134 mates with an inner curved surface of the support 98 at the channel 110. An O-ring seal in an annular groove of the bulbous end produces a fluid-tight connection. To maintain the bulbous end 134 in a fluid-tight engagement with the inner curved surface of the bracket 98, a split retainer 138 and a nut 140 are assembled over the transfer tube 132. At the clevis pin end of the transfer tube 132, the bulbous end 136 mates with a cap 142 slidably positioned in the channel 130. The cap 142 is urged into a fluid-tight arrangement with the bulbous end 136 by means of a spring 144 in contact with a stop ring 146 resting against a shoulder formed in the channel 130.

With the rotational coupling illustrated in FIG. 5, rotation of the actuator 96 about the longitudinal axis of the transfer tube 112 is limited only by structure other than the rotational coupling. For rotation about the longitudinal axis of the actuator 96, the short transfer tube 132 enables the actuator to rotate over a wide angular motion. Because of the ability of the rotational coupler of FIG. 5 to allow the actuator 96 to rotate over a wide angular range, the bulbous ends of each of the transfer tubes mate with an inner curved surface to insure a seal-tight arrangement for all rotational positions of the actuator.

While several embodiments of the invention, together with modifications thereof, have been described in detail herein and shown in the accompanying drawings, it will be evident that various further modifications are possible without departing from the scope of the invention.

What is claimed is:

1. In a fluid control system, comprising in combination:
   a housing including a pivotal support and having first and second channels,
   a power actuator pivotally mounted with respect to said housing and rotatable with respect thereto, said actuator having a manifold with first and second channels,
   means for mounting said actuator to the pivotal support of said housing,
   a first transfer tube in communication with the first channel of said housing and extending therefrom to the first fluid channel of the manifold of said actuator,
   means for pivotally sealing said first transfer tube in the first channel of said housing and the first channel of the manifold of said actuator,
   a second transfer tube movable with reference to said first tube and coaxially arranged therewith in communication with the second channel of said housing and extending therefrom to the second fluid channel of the manifold of said actuator, and means for pivotally sealing said second transfer tube in the second channel of said housing and the second channel of the manifold of said actuator to provide two independent fluid passages between the channels of said housing and the channels of the manifold of said actuator.

2. In a fluid control system as set forth in claim 1 wherein said means for pivotally sealing said first and second transfer tubes at the respective channels includes a ring seal at each end of said tubes mating with fittings of the channels at said housing and of the channels at the manifold of said actuator respectively.

3. In a fluid control system as set forth in claim 1 wherein said means for pivotally sealing said first and second transfer tubes includes an O-ring seal in an annular groove formed at the ends of said tubes, said O-ring seal mating with fittings of the channels of said housing and the channels of the manifold of said actuator, respectively.

4. A rotational coupler as set forth in claim 3 wherein said means for pivotally sealing the first and second transfer tubes further includes a bulbous collar at each end of the said transfer tubes.

5. In a fluid control system, comprising in combination:

a housing including a pivotal support and having first and second channels, a power actuator pivotally mounted with respect to said housing and rotatable with respect thereto, said actuator having a manifold with first and second channels, a hollow pin for mounting said power actuator to the pivotal support of said housing, said pin having a channel in communication with the second channel of the manifold of said actuator for extending the second channel to an open end of said pin, a first transfer tube in communication with the first channel of said housing and extending therefrom to the first channel of the manifold of said actuator, means for pivotally sealing said first transfer tube in the first channel of said housing and the first channel of the manifold of said actuator, a second transfer tube movable with reference to said first tube and coaxially arranged therewith in communication with the second channel of said housing and extending therefrom to the channel of said hollow pin, and means for pivotally sealing said second transfer tube in the second channel of said housing and the channel of said pin to provide two independent fluid passages between the channels of said housing and the channels of the manifold of said actuator.

6. In a fluid control system as set forth in claim 5 wherein said means for pivotally sealing said first transfer tube at the channel of said housing and the channel of the manifold of said actuator includes a ring seal at each end thereof mating with fittings of the first channel of said housing and the first channel of the manifold of said actuator, and said means for pivotally sealing said second transfer tube at the second channel of said housing and the channel of said hollow pin includes a ring seal at each end thereof mating with fittings of the second channel of said housing and the channel of said hollow pin.

7. In a fluid control system as set forth in claim 5 wherein said means for pivotally sealing said first and second transfer tubes includes an O-ring seal in an annular groove formed at the ends of said tubes, said O-ring seals mating with fittings in the respective channels with said tubes in communication.

* * * * *